United States Patent
Jochman

(10) Patent No.: US 9,457,417 B2
(45) Date of Patent: Oct. 4, 2016

(54) SINGLE ELECTRONIC GOVERNOR FOR MULTIPLE ENGINES

(75) Inventor: Nathan J. Jochman, Appleton, WI (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 881 days.

(21) Appl. No.: 13/420,184

(22) Filed: Mar. 14, 2012

(65) Prior Publication Data

US 2013/0239927 A1    Sep. 19, 2013

(51) Int. Cl.
| | |
|---|---|
| *B23K 9/10* | (2006.01) |
| *F02D 11/10* | (2006.01) |
| *F02D 31/00* | (2006.01) |
| *F02D 9/10* | (2006.01) |
| *F02D 29/06* | (2006.01) |

(52) U.S. Cl.
CPC .......... *B23K 9/1006* (2013.01); *F02D 9/1065* (2013.01); *F02D 11/10* (2013.01); *F02D 11/105* (2013.01); *F02D 29/06* (2013.01); *F02D 31/00* (2013.01); *F02D 2011/101* (2013.01)

(58) Field of Classification Search
CPC ... B23K 9/1006; F02D 11/10; F02D 11/105; F02D 2011/101; F02D 29/06; F02D 31/00; F02D 9/1065
USPC ........................... 123/19, 337, 339.1, 339.14, 123/339.19–339.21, 339.25–339.27, 376, 123/377, 343, 363, 399, 400–403; 73/531; 219/133; 290/40 F
See application file for complete search history.

(56) References Cited

U.S. PATENT DOCUMENTS

| | | | |
|---|---|---|---|
| 2,039,495 A | 5/1936 | Schlosser | |
| 2,140,530 A * | 12/1938 | Kemp | 137/483 |
| 2,174,309 A * | 9/1939 | Thiemann | 73/530 |
| 2,340,094 A * | 1/1944 | Whittaker | 318/612 |
| 2,373,334 A | 4/1945 | Palmer | |
| 2,396,176 A | 3/1946 | Hobart | |
| 3,249,098 A * | 5/1966 | Rosenberg | F02D 31/002 123/356 |
| 4,531,489 A * | 7/1985 | Sturdy | 123/320 |
| 5,033,433 A * | 7/1991 | Churchill | F02D 11/10 123/361 |
| 5,353,762 A * | 10/1994 | Dykstra et al. | 123/352 |
| 5,991,362 A | 11/1999 | Jones | |
| 7,980,911 B2 | 7/2011 | Maeda et al. | |
| 8,115,328 B2 | 2/2012 | Fosbinder et al. | |

(Continued)

FOREIGN PATENT DOCUMENTS

| | | | | |
|---|---|---|---|---|
| GB | 1370347 A | | 10/1974 | |
| JP | 09126020 A | * | 5/1997 | F02D 41/14 |

OTHER PUBLICATIONS

150923 Machines & Mechanisms applied kinematic analysis, 4th ed Myszka pp. 72-84.*

(Continued)

*Primary Examiner* — Erick Solis
*Assistant Examiner* — Carl Staubach
(74) *Attorney, Agent, or Firm* — Fletcher Yoder P.C.

(57) ABSTRACT

A governor system is provided that includes a governor having an actuator, and a coupler link configured to couple at a first end to the actuator and at a second end to a throttle of an engine being controlled. One or more mechanical characteristics of the coupler link, the throttle, an actuator arm of the actuator, or some combination thereof, are specific to the engine and configured such that each position of the actuator causes a given output of the engine independent of particular characteristics of the engine.

20 Claims, 7 Drawing Sheets

(56) References Cited

U.S. PATENT DOCUMENTS

| | | | |
|---|---|---|---|
| 2002/0157640 A1* | 10/2002 | Matthews | F02D 11/105 123/399 |
| 2006/0006013 A1* | 1/2006 | van der Kaay | B60K 31/04 180/170 |
| 2007/0045259 A1 | 3/2007 | Beeson et al. | |
| 2007/0181100 A1* | 8/2007 | Grybush et al. | 123/400 |
| 2008/0264921 A1 | 10/2008 | Kropp et al. | |
| 2008/0264922 A1 | 10/2008 | Fosbinder | |
| 2009/0194067 A1* | 8/2009 | Peotter | B66C 23/42 123/350 |
| 2010/0194356 A1 | 8/2010 | Fosbinder et al. | |
| 2010/0199753 A1 | 8/2010 | Renner et al. | |
| 2010/0199950 A1 | 8/2010 | Renner | |
| 2012/0138582 A1 | 6/2012 | Radtke et al. | |

OTHER PUBLICATIONS

International Search Report from PCT application No. PCT/US2013/030693 dated Jul. 5, 2013, 11 pgs.

* cited by examiner

SINGLE ELECTRONIC GOVERNOR FOR MULTIPLE ENGINES

BACKGROUND

The invention relates generally to welding systems, and more particularly to engine driven welding systems utilizing a single electronic governor configured to control multiple engines.

Welding systems generally use an electrical current (e.g., welding current) to perform welding. The electrical current may be provided by an electrical power source (such as a power grid or battery) or an electrical generator coupled to a mechanical power source. Examples of mechanical power sources include engines that output power via a rotating drive shaft. Typically, the drive shaft is coupled to other devices that consume the energy provided by the rotating drive. For instance, welding systems often include internal combustion engines (such as gas or diesel engines) and an alternator or generator configured to convert the mechanical energy generated by the engine into electrical energy (e.g., electrical current). These systems are often referred to as engine-driven welding generators. Such engine driven welding systems are generally designed to operate at multiple speeds.

Governor systems are generally attached to engine driven welding systems. The governor system limits and controls the operating speed of the engine by controlling the energy source going to the rotating drive shaft of the engine. Governor systems have traditionally either fallen into the categories of mechanical governors, such as direct acting flyball and solenoid governors, or electronically controlled governors. Electronic governor systems typically consist of a controller (e.g., including a user interface, processor, and printed circuit board), speed sensor or frequency detector circuitry to monitor the speed of the engine drive shaft, and an actuator attached by linkage to the engine throttle control. In comparison to mechanical governors, electronic governors have the advantages of governing at multiple speeds, tighter control and accuracy of speed, and better response time. However, for small engine driven systems such as welding systems, electronic governors are typically not readily available. For this reason, a custom electronic governor is typically designed for each engine type in a single application (i.e., engine driven welding systems application) due to each engine type having different response characteristics. For example, a single electronic governor may capably control a carbureted engine, but the same electronic governor may not control an electronic fuel injection (EFI) engine.

BRIEF DESCRIPTION

In one embodiment, a welding system includes a generator configured to produce an electrical current. The welding system also includes an engine coupled to the generator and configured to provide power to the generator for producing the electrical current. The engine comprises a throttle. The welding system also includes a governor system configured to control the throttle. The governor system includes a governor having an actuator. The governor system also includes a coupler link coupled to the actuator and the throttle. One or more mechanical characteristics of the coupler link, the throttle, an actuator arm of the actuator, or some combination thereof, are specific to the engine and configured such that each position of the actuator causes a given output of the engine independent of particular characteristics of the engine.

In another embodiment, an engine-driven power source includes an engine having a throttle, and a governor system configured to control the throttle. The governor system includes a governor having an actuator. The governor system also includes a coupler link coupled to the actuator and the throttle. One or more mechanical characteristics of the coupler link, the throttle, an actuator arm of the actuator, or some combination thereof, are specific to the engine and configured such that each position of the actuator causes a given output of the engine independent of particular characteristics of the engine.

In another embodiment, a governor system includes a governor having an actuator, and a coupler link configured to couple at a first end to the actuator and at a second end to a throttle of an engine being controlled. One or more mechanical characteristics of the coupler link, the throttle, an actuator arm of the actuator, or some combination thereof, are specific to the engine and configured such that each position of the actuator causes a given output of the engine independent of particular characteristics of the engine.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
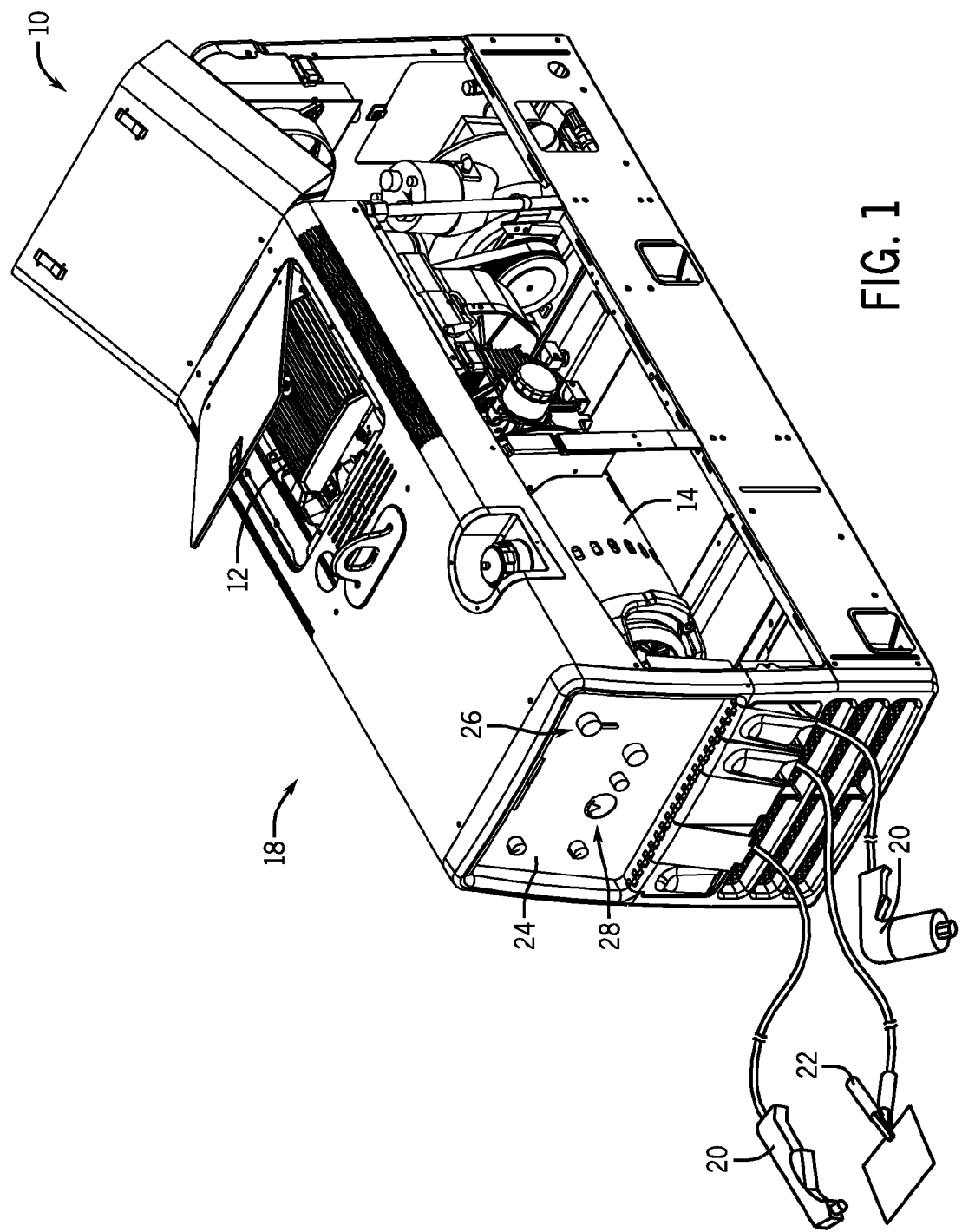
FIG. 1 is a partial perspective view of an exemplary engine-driven welding generator system, wherein two top access panels are rotated to open positions and a side access panel is removed to reveal various internal features.
Figure 2:
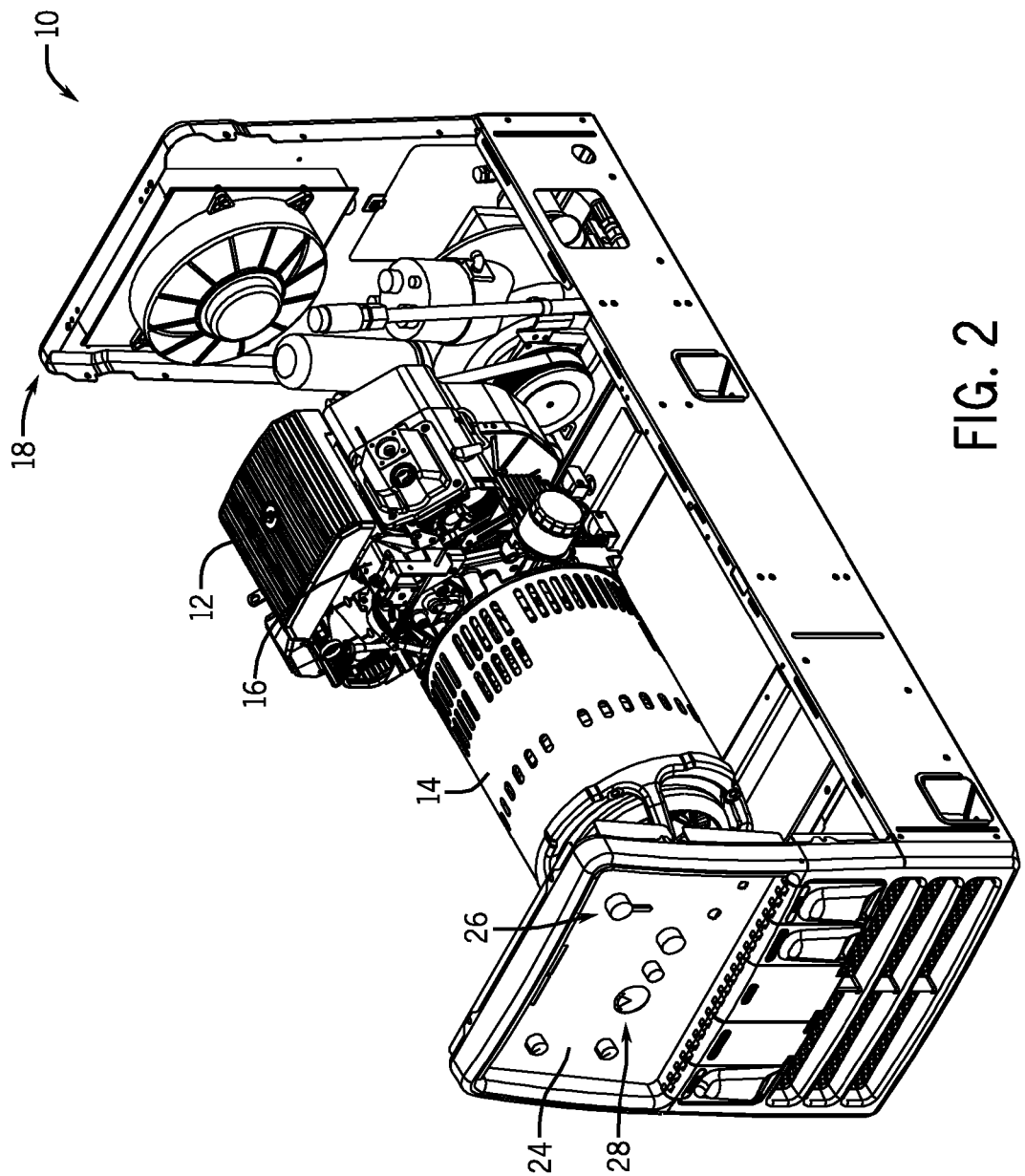
FIG. 2 is another partial perspective view of the engine-driven welding generator system illustrated in FIG. 1, wherein an entire top access panel assembly is removed to further illustrate various internal features.

Referring now to the drawings, FIGS. 1 and 2 illustrate an engine-driven welding generator system 10 having an engine 12 drivingly coupled to a welding generator 14 and an electronic governor 16 attached to the engine 12 in a single enclosure 18 in accordance with an exemplary embodiment of the present technique. FIG. 1 is a partial perspective view of the system 10 with side access panels removed and top access panels or hatches rotated to open positions. FIG. 2 is another partial perspective view of the system 10 as illustrated in FIG. 1, wherein the entire top access panel assembly is removed to provide a better view of the internal features of the system 10. The system 10 is configured to provide multiple outputs, including welding current to be provided to a welding torch 20 and a welding clamp 22, alternating current (AC) power, and compressed air. As described below, the system 10 may include a user interface to monitor speed, power, and various other operating parameters of the engine 12 (e.g., utilizing the electronic governor 16). The system 10 may also include a battery and/or a battery charge system, which may include features to monitor conditions of the battery (e.g., internal or external to the system 10) and to adjust the characteristics of the charge (e.g., variable output level, duration, etc.).

As discussed in detail below, the illustrated system 10 includes a number of features to improve serviceability, reliability, controllability, and integration of the governor 16 within the single enclosure 18 of the system 10. For example, many different engine types may be utilized in the illustrated system 10. As used herein, the term "engine type" refers to the different engine manufacturers, the type of fuel used by the engine 12, and the method of fuel delivery utilized by the engine 12. In certain embodiments, the engine 12 may utilize a fuel type of liquefied petroleum (LP) or gasoline. In addition, in certain embodiments, the engine 12 may utilize fuel delivery of carbureted or electronic fuel injected (EFI). The electronic governor 16 described herein may effectively control the engine 12 irrespective of such engine characteristics. More specifically, as described in greater detail below, the electronic governor 16 is configured to any given type of engine 12 based on a single governor control algorithm that is not specific to the type of engine 12 being controlled by the electronic governor 16.

The engine 12 includes a power source configured to provide power to the generator 14. In an embodiment, the engine 12 may include a combustion engine powered by gasoline, diesel, LP fuel, natural gas, or other fuels, and driving one or more rotating drive shafts. For example, in certain embodiments, the engine 12 may include an industrial gas/diesel engine configured to output anywhere from approximately 24 horsepower (HP) to approximately 64 HP. Also, the weight of such an engine 12 may vary with the size and HP rating of the engine 12. At the current power rating and physical size, the engine 12 within the portable system 10 may be what is referred to as a small industrial engine.

As discussed previously, embodiments may include a generator 14 coupled to the engine 12. Thus, the generator 14 may convert the power output (e.g., mechanical energy) of the engine 12 into electrical power. Generally, the generator 14 includes a device configured to convert a rotating magnetic field into an electrical current (e.g., AC generator). The generator 14 includes a rotor (rotating portion of the generator) and a stator (the stationary portion of the generator). In an embodiment, the generator 14 may include a four-pole rotor and three-phase weld output configured to provide beneficial welding characteristics. Further, the generator 14 may include a plurality of independent winding sections in the rotors and/or stators, such that the generator 14 is configured to output multiple electrical outputs having different characteristics. For example, the generator 14 may include a first section configured to drive a welding current to a welder and a second section configured to drive a current for other AC outputs. In certain embodiments, the independent windings may also be combined in a single stator to provide independent welding and AC current. Further, the stator may produce only an AC output, and that output may be used directly or indirectly to provide AC output, as well as weld output, for the user.

As depicted in FIGS. 1 and 2, a control panel 24 is coupled to an end of the enclosure 18 near the generator 14. The control panel 24 may include various control inputs, indicators, displays, electrical outputs, air outputs, and so forth. In an embodiment, a user input 26 may include a knob or button configured for a mode of operation, an output level or type, etc. For instance, the user input 26 may include a dial to select a mode of operation, such as a DC weld, an AC weld, a battery charge, or an air tool operation. The control panel 24 may also include various indicators 28 to provide feedback to the user. For example, the indicator 28 may include an LCD, LED, or Vacuum Florescent display to display voltage, amperage, air pressure, and similar operating parameters. Embodiments of the control panel 24 include any number inputs and outputs, such as welding methods, engine speed settings, and system power. As will be appreciated, the control panel 24 may be configured to interact with the electronic governor 16 described herein to modify how the electronic governor 16 controls the engine 12 and the generator 14.

Figure 3:
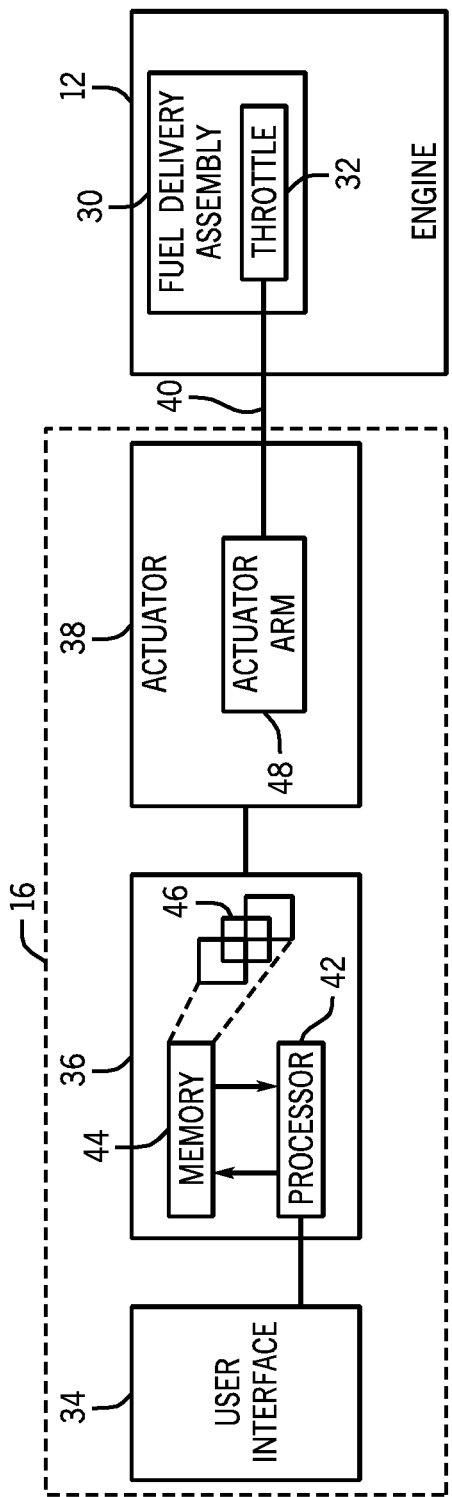
FIG. 3 is a schematic diagram of an exemplary embodiment of the electronic governor, and a linkage between the electronic governor and a driven engine.

Now referring to FIG. 3, in a present embodiment, the system 10 includes the electronic governor 16 electrically and mechanically coupled to the engine 12, and configured to control and monitor the speed of the engine 12. As depicted, the engine 12 includes a fuel delivery assembly 30 mechanically coupled to a throttle 32, which generally controls the output of the engine 12. In certain embodiments, the electronic governor 16 includes a user interface 34 (e.g., which may be part of the control panel 24 illustrated in FIGS. 1 and 2), control circuitry 36, and an actuator 38. The electronic governor 16 is mechanically coupled to the engine 12 through a linkage 40 (e.g., a coupler link or connector rod) from the actuator 38 of the electronic governor 16 to the throttle 32 of the engine 12. As previously discussed, the electronic governor 16 is generally configured to regulate the speed of engine 12 (e.g., revolutions per minute (rpm)) based on a predetermined programmable set point. The set point is a programmable target value that the electronic governor 16 will aim to reach by varying the energy source going to the rotating drive shaft of the engine 12. For example, if the engine 12 is started, and begins to run at a speed lower than the predetermined programmable set point, the electronic governor 16 will increase fuel flow to the engine 12 (e.g., by adjusting a position of the throttle 32) until the desired operating speed is reached. From then on, the electronic governor 16 will adjust fuel flow as required to maintain the programmable set point. In other embodiments, the electronic governor 16 may be required to continuously vary the speed of the engine 12 due to frequent changes in load demand. For example, a user may require that a high output power be maintained over a duration of time to perform a given welding task. In such a case, the electronic governor 16 may continuously vary the speed of the engine 12, such that the output power desired by the user is sustained to perform the given welding task or similar tasks.

As previously discussed, the electronic governor 16 includes the user interface 34 and control circuitry 36. The user interface 34 is the means by which a user or an operator interacts with the electronic governor 16. The user interface 34 may include input devices such as a keyboard, mouse, stylus, pushbuttons, or any form of transducer that converts a physical interaction with the user interface 34 into an electrical signal input. In certain embodiments, the user interface 34 may also include, but is not limited to, a display screen to display graphics, buttons, icons, text, windows, software applications, menus, or any readable and/or writable data used to communicate with the electronic governor 16. The user interface 34 may also display the parameters of the engine 12 such as, but not limited to, speed of the engine 12 in rpm, power of the engine 12 in HP, watts (W), or any combination thereof, and system voltages and currents operating under normal and fault conditions. As will be appreciated, the user interface 34 is where the user or operator inputs or programs a speed set point of the engine 12, a mode of operation (e.g., auto-speed or high-speed) of the engine 12, or other controllable parameters.

In an embodiment, the control circuitry 36 includes a processor 42 and memory 44. The control circuitry 36, in certain embodiments, may be a printed circuit board (PCB) assembly containing the processor 42, the memory 44, passive and active electronic elements in support of the processor 42 and the memory 44, a plurality of programmable input/output (I/O) pins and modules, and so forth. The processor 42 is configured to execute computer-readable instructions 46 stored on the memory 44. The computer-readable instructions 46 may contain software control algorithms, software code, firmware, and so forth. For example, the control circuitry 36 may be programmed to control all engine functions such as speed, air and fuel flow, overvoltage and overcurrent engine protection, as well as monitoring and recording. The control circuitry 36 may be powered by a battery contained within system 10.

As part of the electronic governor 16, the control circuitry 36 is electrically coupled to an actuator 38 and a speed sensor unit positioned to monitor the rotating drive shaft of engine 12. As used herein, a speed sensor unit may be a proximity probe, magnetic probe, or similar device for sensing a physical quantity related to a speed of the engine 12. In addition to monitoring the rotating drive shaft of the engine 12 directly, speed sensing may be achieved by measuring the frequency output of the AC generator 14, which may be proportional to the speed of the generator 14 and, thus proportional to the speed of the engine 12. The control circuitry 36 may be programmed by way of the user interface 34 to monitor a predetermined programmable set point value, and to output a response signal. The speed sensor unit may be connected to input pins or modules of the control circuitry 36, and may send electrical output signals (e.g., AC signals or pulse-width modulated signals) to the control circuitry 36. In certain embodiments, the control circuitry 36 may constantly read the electrical input signals from the speed sensor unit, counting shifts in frequency pulses in order determine a speed value, for example. The control circuitry 36 then compares that value to the predetermined set point value, and sends a signal (e.g., DC voltage) to the actuator 38 to operate the throttle 32 to increase or decrease the speed of engine 12.

In certain embodiments, the actuator 38 may be a pneumatic, hydraulic, or electrically powered device that converts an electrical signal from the control circuitry 36 into a mechanical force and motion to rotate and position the mechanically-coupled throttle 32. The actuator 38 may be communicatively coupled to the control circuitry 36 to receive control commands and rotate the throttle 32 a number of degrees accordingly. For example, the actuator 38 may receive an electrical signal (e.g., DC signal) to increase the speed of the engine 12. In response to the received command, the actuator 38 may output a torque to the throttle 32 that is proportional to the received electrical signal to effectively increase the speed of the engine 12. The actuator 38 may also receive a stepped signal (e.g., discretely sampled or pulsed AC voltage) to change the speed of the engine 12. In response to the stepped signal, the actuator 38 may output an angular displacement proportional to the number of steps (e.g., voltage levels) received from the control circuitry 36. The actuator 38 may be of, but is not limited to, a rotary or linear design. In a rotary actuator design, the actuator 38 produces a rotational motion, whereas in a linear actuator design, the actuator 38 produces a linear motion. As will be appreciated, linear actuators typically provide less degrees of freedom as compared to rotary actuators.

In certain embodiments, the actuator 38 includes an actuator arm 48, to which the linkage 40 is coupled at one end and coupled at the opposing end to the throttle 32. The actuator arm 48 may be included as part of the internal mechanical parts of the actuator 38 or as an external mechanical linkage. The addition of the actuator arm 48 may control actuator degrees of freedom by providing an articulated or pivoting joint. For example, when using a rotary actuator, the linkage between the actuator 38 and the throttle 32 may be facilitated by the actuator arm 48 to create a four-bar linkage, thus allowing engine controllability.

As previously discussed, the throttle 32 is attached to engine 12. The throttle 32 may be a mechanical device employed to regulate fluid, usually fuel and air, flowing to the engine 12. As depicted in FIG. 3, the throttle 32 may be mechanically coupled to the fuel delivery assembly 30 at one end, and mechanically coupled by way of the linkage 40 to the actuator 38 and actuator arm 48 at the opposing end. The fuel delivery assembly 30 may be a carburetor, throttle for electronic fuel injection (EFI), or a combination thereof. The throttle 32 may control the flow of fuel and air entering the engine 12, and thus control fuel-air combustion on each engine cycle. For example, in fuel-injected automotive internal combustion engines, the throttle 32 may be the device that regulates the engine's air consumption in response to a driver depressing the accelerator pedal. This, in turn, determines the rate of acceleration of the automobile.

The linkage 40 mechanically couples the actuator 38 to the throttle 32. More generally, the linkage 40 links or connects the electronic governor 16 to the engine 12. As used herein, the linkage 40 may be a rigid body that manages mechanical force and motion from the actuator arm 48 to the throttle 32. In certain embodiments, the linkage 40 may be a single rigid body or an assembly of such. As depicted in both FIGS. 3 and 4, the linkage 40 transforms the mechanical output of displacement (e.g., angular or linear displacements) from the actuator 38 to the throttle 32, thus producing a control mechanism to the engine 12. The linkage 40 may produce rotation or sliding mechanical movement depending on the design of the actuator 38. The linkage 40, or an assembly of such, creates joints, wherein a given joint may have a plurality of mechanical displacement parameters or degrees of freedom (DOF).

The degree of freedom (DOF) defines the mobility of the linkage 40 or linkage assembly configuration parameters, and enables the use of a graph to model linkage joint and displacement paths. For example, as described in greater detail below, the configuration parameters of the linkage 40 may be the angles formed by the rotational displacement of the linkage 40 about a given joint. One or more mechanical characteristics of the linkage 40 may be adjusted as desired per application. For example, the link lengths and angle displacements may be modified to achieve desired engine control and response. More specifically, the mechanical characteristics of the actuator arm 48 (and how the actuator arm 48 connects to the linkage 40), the linkage 40 itself, the throttle 32 (and how the throttle 32 connects to the linkage 40, or some combination thereof, may be specific to the particular engine 12 being controlled. In contrast, the control circuitry 36 of the electronic governor 16 may be configured to change a rotation or position of the actuator arm 48 to cause a resulting output of the engine 12 using a control curve that is not specific to the particular engine 12 being controlled.

Again, the linkage 40 couples mechanically at a first end to the actuator 38 of the electronic governor 16, and couples mechanically at a second end to the throttle 32 of the engine 12. As described above, the electronic governor 16 controls one or more physical output parameters (e.g., speed or power) of the engine 12, where the engine 12 may be an engine that utilizes any number of different fuel types (e.g., liquefied petroleum or gasoline), and may comprise any type of different fuel delivery assemblies (e.g., carbureted, EFI, and so forth). According to present embodiments, the electronic governor 16, include the user interface 34, processor-based control circuitry 36, speed sensor unit, and actuator 38, may control the engine 12 irrespective of the engine manufacturer, engine fuel type, engine fuel delivery assembly, and so forth.

Figure 4:
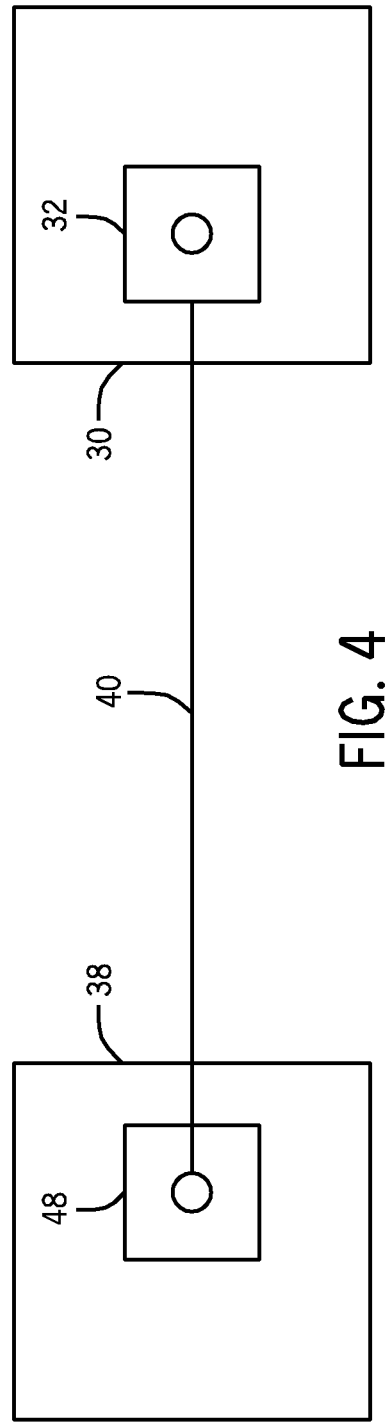
FIG. 4 is a schematic diagram of an exemplary embodiment of the linkage from an actuator of the electronic governor to a throttle of the engine.
Figure 5:
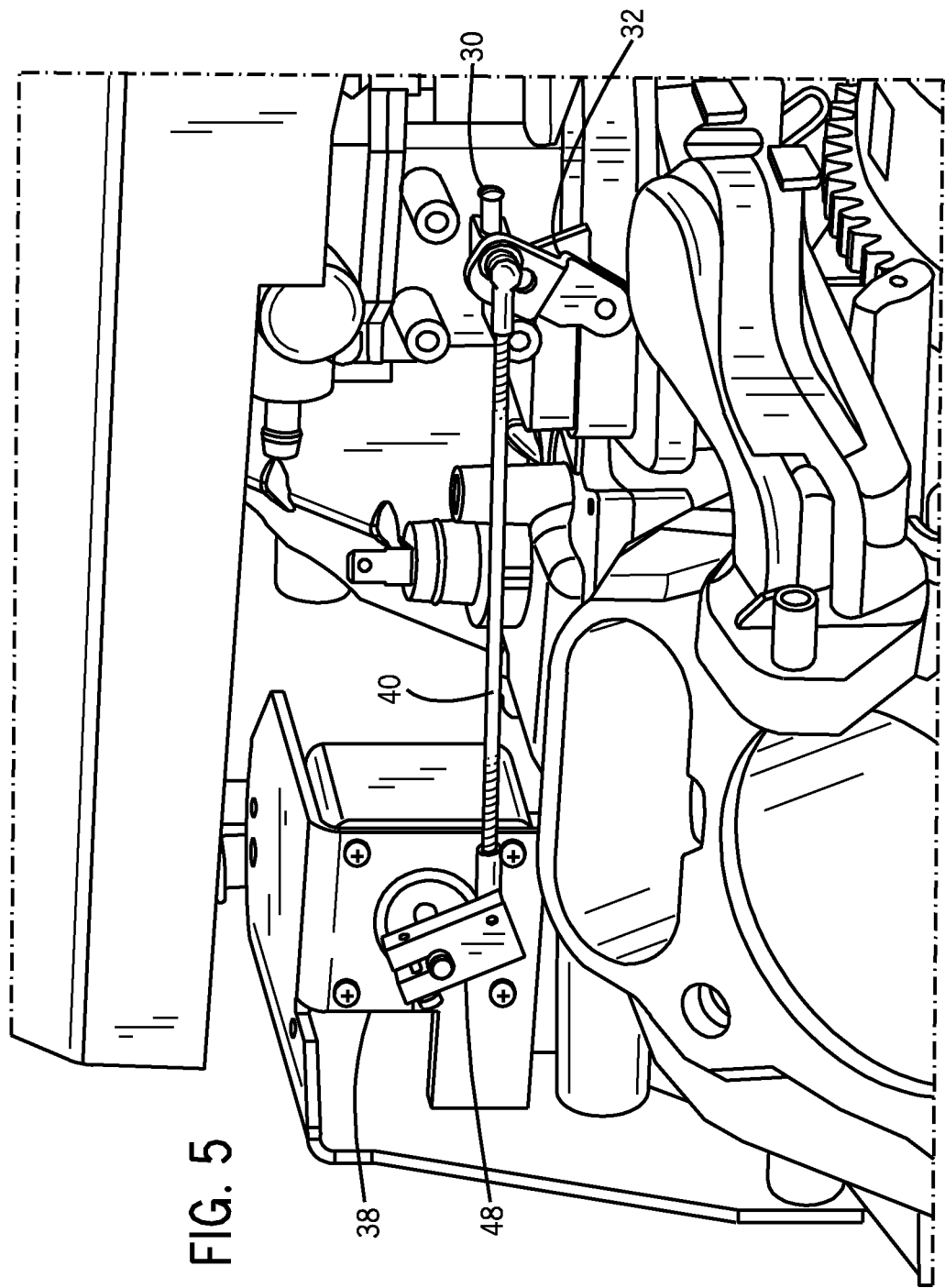
FIG. 5 is a perspective view of an exemplary engine-driven welding generator system displaying a mechanical linkage coupled at one end to the actuator and actuator arm and coupled at the opposing end to a fuel delivery system and throttle of the engine.

As depicted in FIGS. 4 and 5, the actuator-to-throttle linkage 40 may be configured to form a four-bar linkage. A four-bar linkage is typically comprised of four links jointed to form a loop. The joints or pivot points may be arranged in such a fashion that the links rotate in parallel planes, forming a repeating geometrical path as it rotates. Within the four-bar linkage mechanism, each link may have disparate functionalities. For example, one of the links is a fixed or ground link, which is typically represented by the frame of a machine. The fixed link acts as reference for the movements of the other three links. Two of the three other links are rotating links, in which one is a driver or crank link and the other is a follower or rocker link. The crank link is jointed to a first end of the fixed link, and may rotate 360 degrees about the fixed link-crank link joint. The rocker link is hinge jointed to a second end of the fixed link. The last link is the coupler link, which couples the second end of the crank link to the second end of the rocker link. The coupler link is also generally the output link in four-bar mechanisms.

Figure 6:
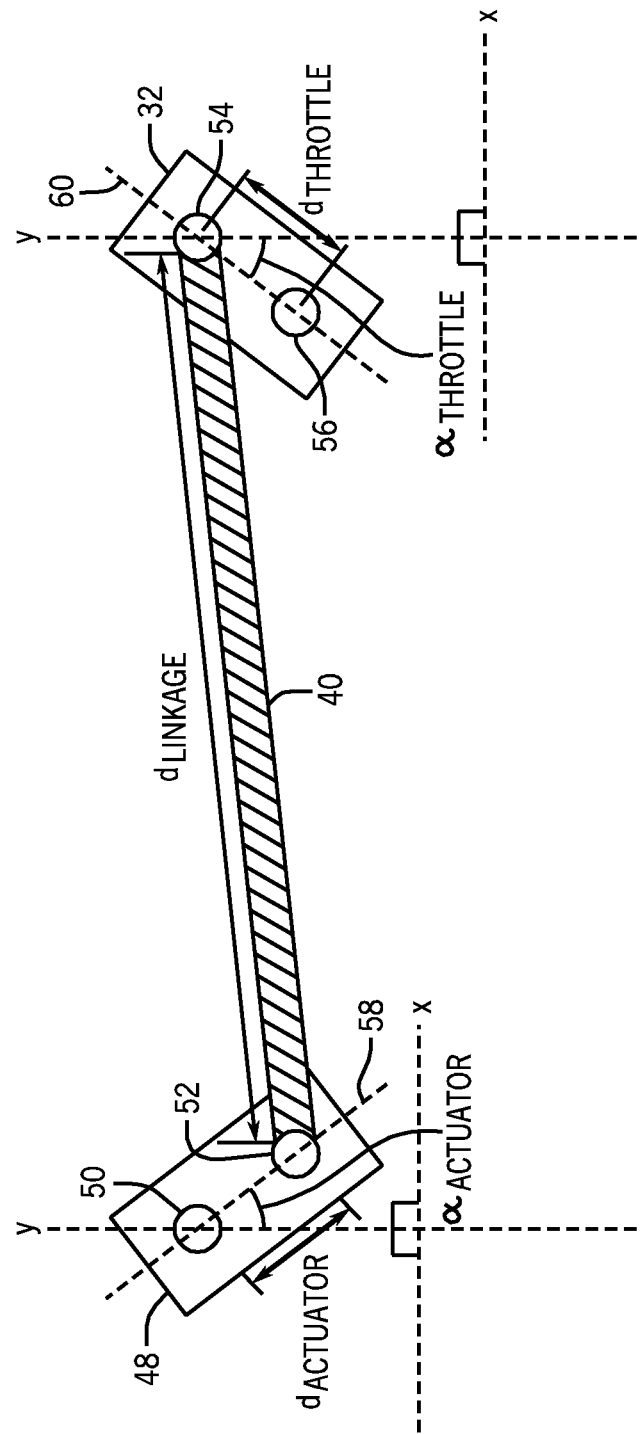
FIG. 6 is a schematic diagram of an exemplary embodiment of the linkage from the actuator of the electronic governor to the throttle of the engine in a four-bar linkage configuration.
Figure 8:
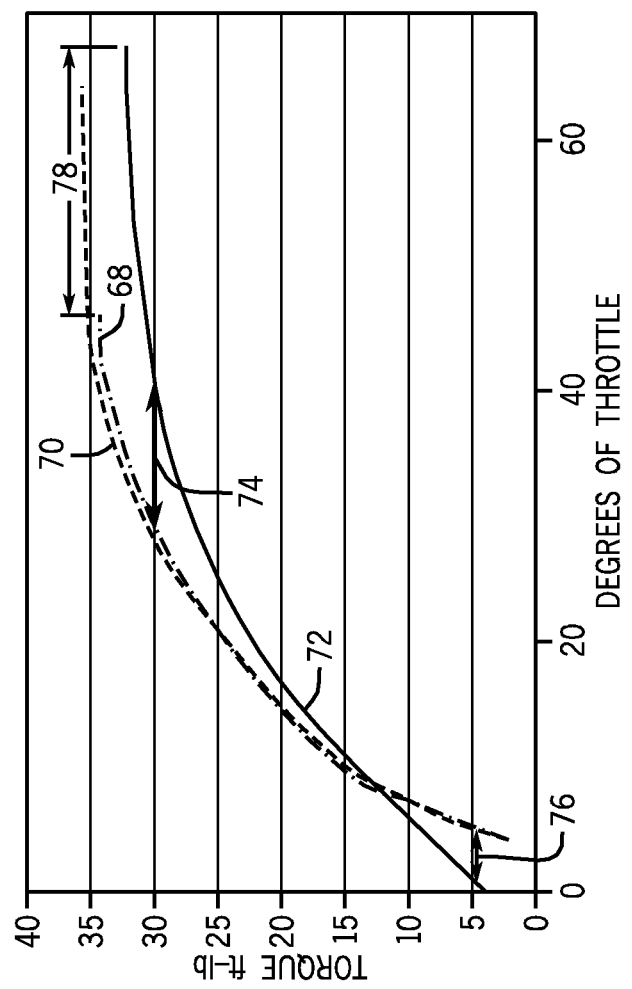
FIG. 8 is a graph displaying engine torque verses throttle position for three different engine types.

In present embodiments, the single electronic governor 16 for multiple engine types is achieved by fabricating a unique actuator-to-throttle linkage 40 for each engine type that is used. As illustrated in FIG. 6, the fabrication of a unique actuator-to-throttle linkage 40 may be achieved by varying and adjusting link lengths $d_{linkage}$, $d_{actuator}$, and $d_{throttle}$ of the linkage 40, the actuator arm 48, and the throttle 32, respectively, varying angles $\alpha_{actuator}$ and $\alpha_{throttle}$ of a initial angular alignment of the actuator arm 48 and the throttle 32, respectively, total angular distances of the actuator arm 48 and the throttle 32, or the combination thereof. To further explain, the link lengths ($d_{linkage}$, $d_{actuator}$, and $d_{throttle}$) and angles ($\alpha_{actuator}$ and $\alpha_{throttle}$) may be varied and adjusted such that an actuator-to-engine torque curve is the same, or at least substantially similar, for any engine 12 utilized in the same application. For example, as illustrated in FIG. 8, for a given welding system 10, the engine torque-to-throttle position curves of a 2400 fuel injected engine (e.g., depicted by line 68), a 2400 carbureted engine (e.g., depicted by line 70), and a 2400 carbureted S engine (e.g., depicted by line 72) are each unique, but may all converge due to having unique actuator 38 to throttle 32 linkages to produce a substantially similar actuator-to-engine torque curve. More specifically, each of the curves 68, 70, 72 may be adjusted (e.g., as illustrated by arrows 74, 76) toward a single response curve, which may be programmed into the control circuitry 36, such that a single control algorithm may be used to control all types of engines 12. This convergence ensures that the resulting output response of the engine 12 that results from the position or rotation of the actuator arm 48 will be similar, irrespective of engine type. As a result, a single electronic governor 16 configured to the converged actuator-to-engine torque curves, may effectively control any engine 12, regardless of (e.g., independent of) particular characteristics of the engine 12 being controlled (or of any engine, for that matter), without the need to customize the software control algorithms of the control circuitry 36.

FIG. 6 illustrates the linkage 40 configured to form a four-bar linkage between actuator 38 and throttle 32. The linkage 40 is mechanically coupled at a first end to the actuator arm 48 and mechanically coupled at a second end to the throttle 32. The distance $d_{linkage}$ is the length of the linkage 40. A first joint 50 of the actuator arm 48 attached to the actuator 38 is separated by a distance $d_{actuator}$ from a second joint 52 of the actuator arm 48 attached to the linkage 40. Similarly, a first joint 54 of the throttle 32 attached to the linkage 40 is separated by a distance $d_{throttle}$ from a second joint 56 of throttle 32 attached to the fuel delivery assembly 30 of the engine 12. A first angle $\alpha_{actuator}$ is formed between the joints 50 and 52 of the actuator arm 48 (e.g., along a central axis 58 of the actuator arm 48) and the X-Y reference plane of actuator arm 48. Similarly, a second angle $\alpha_{throttle}$ is formed between the joints 54 and 56 of the throttle 32 (e.g., along a central axis 60 of the throttle 32) and the X-Y reference plane of throttle 32. As depicted, the four-bar linkage has four links, four revolute joints, and one degree of freedom. This indicates that only the actuator 38 input is required to rotate the linkage, and thus rotate the throttle 32. As shown, the linkage 40 represents the coupler link, which is the input link from the actuator 38 to the throttle 32. Furthermore, the rotary actuator illustrated in FIG. 6 is used to allow for easy manipulations of the link lengths ($d_{linkage}$, $d_{actuator}$, and $d_{throttle}$) and angles ($\alpha_{actuator}$ and $\alpha_{throttle}$) to create a unique linkage assembly that is specific to the engine 12 being driven by the actuator 38. This leads to greater efficiency and accuracy in the positioning of the throttle 32. As an example, FIG. 5 shows a welding system 10 with a linkage 40 configured to form a four-bar linkage between the actuator 38 and the throttle 32.

Figure 7:
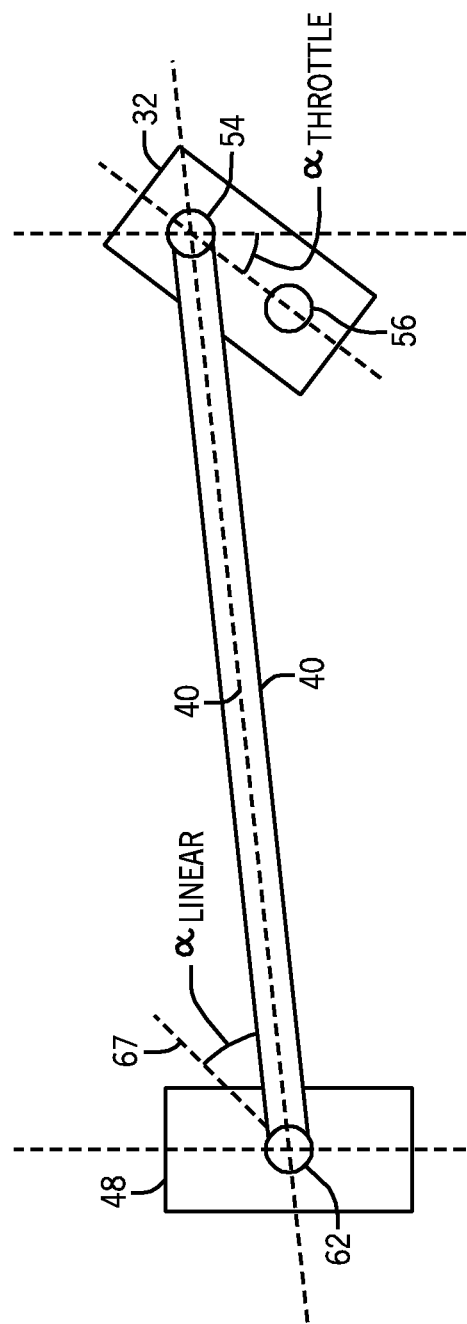
FIG. 7 is a schematic diagram of an exemplary embodiment of the linkage from the actuator of the electronic governor to the throttle of the engine in a crank and slider linkage configuration.

In another embodiment, FIG. 7 illustrates a linkage 40 configured to form a three-bar linkage between the actuator 38 and the throttle 32. The three-bar linkage configuration may also be referred to as a crank (e.g., throttle 32) and slider (e.g., actuator 38) linkage configuration, in which the actuator 38 may produce a sliding motion of the linkage 40 to rotate the throttle 32. Similarly as described above, the linkage 40 is mechanically coupled at a first end to an actuator arm 48 and mechanically coupled at a second end to the throttle 32. In this embodiment, the actuator arm 48 comprises a single joint 62 as a linear actuator that translates in only one direction in the X-Y plane, as illustrated by the line 67. An angle $\alpha_{linear}$ is formed between the linkage 40 and the direction of translation 67 of the linear actuator arm 48 illustrated in FIG. 7. The three-bar linkage uses a linear actuator, and has three links, three joints, and one degree of freedom. Similar again to the described four-bar linkage configuration, the linkage 40 represents the input link from the actuator 38 to the throttle 32. Furthermore, in addition to the link lengths ($d_{linkage}$ and $d_{throttle}$) and angle ($\alpha_{throttle}$) of the linkage 40 and the throttle 32, the angle $\alpha_{linear}$ of linear actuator arm 48 illustrated in FIG. 7 may be adjusted to create a unique linkage assembly that is specific to the engine 12 being driven by the actuator 38.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
a generator configured to produce an electrical current;
an engine coupled to the generator and configured to provide power to the generator for producing the electrical current, wherein the engine comprises a throttle, and wherein the engine comprises an engine type of a plurality of engine types, wherein each engine type has a throttle-output relationship specific to the engine type; and
a governor system configured to control the throttle, wherein the governor system comprises:
a governor comprising an actuator;
a coupling system configured to couple to the actuator and to the throttle, wherein the coupling system is one of a plurality of coupling systems, each coupling system configured to be coupled to the actuator and to a throttle of an engine type of the plurality of engine types, wherein the coupling system is specific to the engine type of the engine and configured to produce a desired output of the engine when the engine comprises any engine type of the plurality of engine types; and
control circuitry configured to provide a signal to the actuator to change a rotation or a position of the coupling system to produce the desired output of the engine, wherein the control circuitry is not specific to the engine type of the engine, and wherein the rotation or the position of the coupling system is based on the desired output and is not based on the engine type of the engine.

2. The welding system of claim 1, wherein the desired output of the engine comprises a speed of the engine, a power output of the engine, a torque of the engine, or some combination thereof.

3. The welding system of claim 1, wherein the coupling system comprises one or more mechanical characteristics specific to the engine type of the engine, wherein the one or more mechanical characteristics include a length of the coupling system.

4. The welding system of claim 1, wherein the throttle comprises a rotating throttle having a pivot point and a linkage point at which the coupling system is attached to the rotating throttle.

5. The welding system of claim 4, wherein the coupling system comprises one or more mechanical characteristics specific to the engine type of the engine, wherein the one or more mechanical characteristics include a distance between the pivot point and the linkage point.

6. The welding system of claim 4, wherein the coupling system comprises one or more mechanical characteristics specific to the engine type of the engine, wherein the one or more mechanical characteristics include an initial angular orientation of the rotating throttle.

7. The welding system of claim 4, wherein the coupling system comprises one or more mechanical characteristics specific to the engine type of the engine, wherein the one or more mechanical characteristics include a total angular distance of the rotating throttle.

8. The welding system of claim 1, wherein the actuator comprises a rotating actuator having a pivot point and a linkage point at which the coupling system is attached to the rotating actuator.

9. The welding system of claim 1, wherein the actuator comprises a linear actuator having a linkage point at which the coupling system is attached to the linear actuator, and wherein the linear actuator is configured to translate along a linear path.

10. The welding system of claim 9, wherein the coupling system comprises one or more mechanical characteristics specific to the engine type of the engine, wherein the one or more mechanical characteristics include an initial location of the linkage point along the linear path.

11. The welding system of claim 9, wherein the coupling system comprises one or more mechanical characteristics specific to the engine type of the engine, wherein the one or more mechanical characteristics include an angular orientation of the linear path with respect to the throttle.

12. An engine-driven power source, comprising:
an engine comprising a throttle, wherein the engine comprises an engine type of a plurality of engine types, wherein each engine type has a throttle-output relationship specific to the engine type; and
a governor system configured to control the throttle, wherein the governor system comprises:
a governor comprising an actuator;
a coupling system configured to couple to the actuator and to the throttle, wherein the coupling system is one of a plurality of coupling systems, each coupling system configured to be coupled to the actuator and to a throttle of an engine type of the plurality of engine types, wherein the coupling system is specific to the engine type of the engine and configured to produce a desired output of the engine when the engine comprises any engine type of the plurality of engine types; and
control circuitry configured to provide a signal to the actuator to change a rotation or a position of the coupling system to produce the desired output of the engine, wherein the control circuitry is not specific to the engine type of the engine, and wherein the rotation or the position of the coupling system is based on the desired output and is not based on the engine type of the engine.

13. The engine-driven power source of claim 12, wherein the coupling system comprises one or more mechanical characteristics specific to the engine type of the engine, wherein the one or more mechanical characteristics include a length of the coupling system.

14. The engine-driven power source of claim 13, wherein the throttle comprises a rotating throttle having a pivot point and a linkage point at which the coupling system is attached to the rotating throttle, and wherein the one or more mechanical characteristics include a distance between the pivot point and the linkage point, an initial angular orientation of the rotating throttle, or a total angular distance of the rotating throttle.

15. The engine-driven power source of claim 13, wherein the actuator comprises a rotating actuator having a pivot point and a linkage point at which the coupling system is attached to the rotating actuator, and wherein the one or more mechanical characteristics include a distance between the pivot point and the linkage point, or an initial angular orientation of the rotating actuator.

16. The engine-driven power source of claim 13, wherein the actuator of the governor comprises a linear actuator having a linkage point at which the coupling system attached to the linear actuator, wherein the linear actuator is configured to translate along a linear path, and wherein the one or more mechanical characteristics include an initial location of the linkage point along the linear path, or an angular orientation of the linear path with respect to the throttle.

17. A governor system, comprising:
a governor comprising an actuator;
a coupling system configured to couple to the actuator and to a throttle, wherein the coupling system is one of a plurality of coupling systems, each coupling system configured to be coupled to the actuator and to a throttle of an engine type of a plurality of engine types, wherein the coupling system is specific to an engine type of an engine and configured to produce a desired output of the engine when the engine comprises any engine type of the plurality of engine types; and
control circuitry configured to provide a signal to the actuator to change a rotation or a position of the coupling system to produce the desired output of the engine, wherein the control circuitry is not specific to the engine type of the engine, and wherein the rotation or the position of the coupling system is based on the desired output and is not based on the engine type of the engine.

18. The governor system of claim 17, wherein the control circuitry comprises a memory and a processor, wherein the processor is configured to execute computer-readable instructions stored in the memory, wherein the computer-readable instructions comprise instructions for controlling the actuator to control the throttle to produce the desired output of the engine, and wherein relationships of the positions of the actuator to outputs of the engine does not change based on the engine type of the engine.

19. The welding system of claim 1, wherein the plurality of engine types comprises a carbureted engine type and an electronic fuel injection (EFI) engine type.

20. The welding system of claim 1, wherein the plurality of engine types comprises a liquefied petroleum (LP) engine type, a gasoline engine type and a natural gas engine type.

* * * * *